(12) United States Patent
Lin et al.

(10) Patent No.: US 11,505,895 B2
(45) Date of Patent: Nov. 22, 2022

(54) ARTIFICIAL LEATHER

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Kao-Lung Yang, Kaohsiung (TW); Yung-Yu Fu, Kaohsiung (TW); Wei-Jie Liao, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 17/190,290

(22) Filed: Mar. 2, 2021

(65) Prior Publication Data

US 2021/0180245 A1 Jun. 17, 2021

Related U.S. Application Data

(62) Division of application No. 16/533,727, filed on Aug. 6, 2019, now Pat. No. 10,968,564.

(30) Foreign Application Priority Data

Aug. 8, 2018 (TW) .................................. 107127579

(51) Int. Cl.
| | | |
|---|---|---|
| *D06N 3/00* | (2006.01) | |
| *D06N 3/14* | (2006.01) | |
| *D04H 1/4358* | (2012.01) | |
| *D04H 1/4374* | (2012.01) | |
| *D04H 1/56* | (2006.01) | |
| *D04H 1/4382* | (2012.01) | |

(52) U.S. Cl.
CPC ......... *D06N 3/0013* (2013.01); *D04H 1/4358* (2013.01); *D04H 1/4374* (2013.01); *D04H 1/4382* (2013.01); *D04H 1/43838* (2020.05); *D04H 1/56* (2013.01); *D06N 3/14* (2013.01); *D06N 2201/0281* (2013.01)

(58) Field of Classification Search
CPC .................. D06N 3/0013; D06N 3/14; D06N 2201/0281; D04H 1/4358; D04H 1/4374; D04H 1/4382; D04H 1/43838; D04H 1/56; B32B 2250/02; B32B 2250/03; B32B 2250/20; B32B 2262/0292; B32B 2437/02; B32B 5/022; B32B 5/26; B32B 27/40; B32B 27/12

See application file for complete search history.

(56) References Cited

U.S. PATENT DOCUMENTS

2007/0166509 A1* 7/2007 Horiguchi ................. B32B 5/26
442/268

FOREIGN PATENT DOCUMENTS

| JP | 4146546 B2 * 9/2008 | |
|---|---|---|
| JP | 2014227637 A * 12/2014 | |
| WO | WO-2010137264 A1 * 12/2010 ............. B29C 43/28 |

\* cited by examiner

*Primary Examiner* — Nathan L Van Sell
(74) *Attorney, Agent, or Firm* — WPAT, P.C., Intellectual Property Attorneys; Anthony King

(57) ABSTRACT

The present disclosure is relates to an artificial leather. The artificial leather includes multi-layer thermoplastic polyurethane (TPU) mesh layers. Fiber fineness of the TPU mesh layers ranges from 5 μm to 30 μm, and peeling strength of the TPU mesh layers is greater than 2.5 Kg/cm.

6 Claims, 3 Drawing Sheets

ARTIFICIAL LEATHER

FIELD

The disclosure relates to an artificial leather.

BACKGROUND

In the prior art, a multilayer artificial leather is universally manufactured by using a plurality of different manufacturing processes, and solvents need to be used in some manufacturing processes, for example, manufacturing processes that include resin dipping or fiber dissolving and removing. However, the foregoing manufacturing method makes a manufacturing process more complex, and does not meet a requirement for environmental protection.

SUMMARY OF THE INVENTION

In accordance with one aspect of the present disclosure, an artificial leather includes multi-layer thermoplastic polyurethane (TPU) mesh layers, and fiber fineness of the TPU mesh layers ranges from 5 μm to 30 μm.

In accordance with another aspect of the present disclosure, a manufacturing method of an artificial leather includes: providing TPU pellets; heating TPU pellets to be melted; meltblowing the melted TPU to form a first TPU mesh layer; meltblowing the melted TPU to form a second TPU mesh layer on the first TPU mesh layer, and form a multi-layer TPU mesh layer structure; and heat pressing the multi-layer TPU mesh layer structure to form an artificial leather.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions off the various features may be arbitrarily increased or reduced for clarity of discussion.

DETAILED DESCRIPTION OF THE INVENTION

Figure 1:
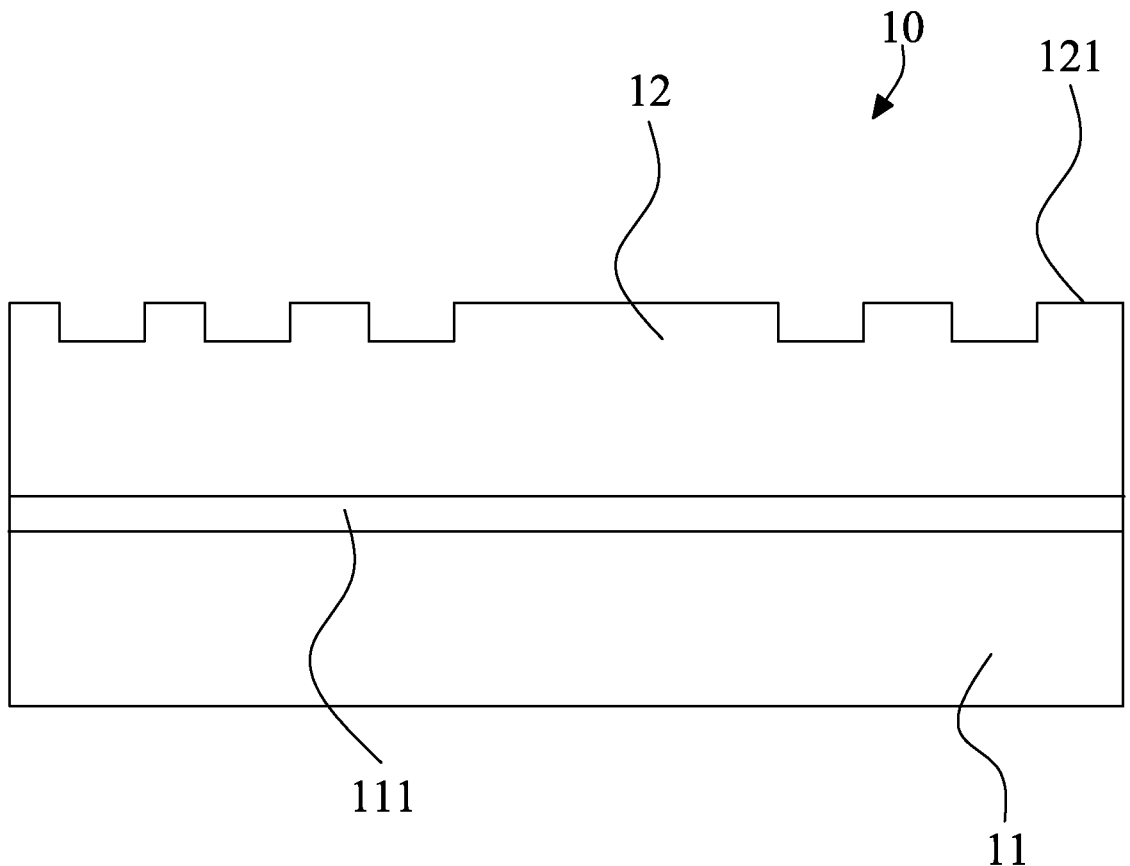
FIG. 1 is a schematic structural diagram of an artificial leather according to an embodiment of the present disclosure.

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; is rather, these embodiments are provided so that this description will be thorough and complete, and will frill$_y$ convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and the are intended to include the plural forms as well, unless the context clearly indicates otherwise.

Unless otherwise defined, all terms (including technical and scientific terms) used herein have the same meaning as commonly understood by one of ordinary skill in the art to which this invention belongs.

It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic structural diagram of an artificial leather according to an embodiment of the present disclosure. Referring to FIG. 1, in an embodiment, an artificial leather 10 includes multi-layer thermoplastic polyurethane (TPU) mesh layers 11 and 12, fiber fineness of the TPU mesh layers 11 and 12 ranges from 5 μm to 30 μm, and the TPU mesh layers 11 and 12 include a surface TPU mesh layer 12. The artificial leather 10 may be applied to a shoes upper material, or may be applied to a shoes upper material of a sport shoe, but is not limited to the foregoing.

In an embodiment, the TPU mesh layers include a first TPU mesh layer 11 and a second TPU mesh layer 12. Fiber fineness of the first TPU mesh layer 11 ranges from 10 μm to 30 μm, and fiber fineness of the second TPU mesh layer 12 ranges from 5 μm to 10 μm. The second TPU mesh layer 12 is disposed on the first TPU mesh layer 11, and the second TPU mesh layer 12 is the surface TPU mesh layer.

In an embodiment, the second TPU mesh layer 12 has a surface 121, and the surface 121 may have a texture, or the surface 121 may have a teasing structure. Therefore, the artificial leather 10 can achieve hand feel or an aesthetic texture effect of a teasing leather.

In an embodiment, peeling strength of the TPU mesh layers of the artificial leather 10 is greater than 2.5 Kg/cm, and a disadvantage that a shoes upper material of a conventional sport shoe cannot achieve high peeling strength can be overcome.

In an embodiment, the artificial leather 10 further includes at least one combination joint 111, formed between the two adjacent TPU mesh layers 11 and 12, The TPU mesh layers are made of a same TPU material, and are formed through stacking in a meltblowing manner. Therefore, during the meltblowing and the stacking, a combination joint 111 may be formed between the two adjacent TPU mesh layers, to more firmly combine the two adjacent TPU mesh layers, and peeling strength of the TPU mesh layers can be increased.

In an embodiment, the TPU mesh layers include a first TPU mesh layer, a second TPU mesh layer, and a third TPU mesh layer. Fiber fineness of the first TPU mesh layer ranges from 10 μm to 30 μm, fiber fineness of the second TPU mesh layer ranges from 10 μm to 30 μm, fiber fineness of the third TPU mesh layer ranges from 5 μm to 10 μm, and the third TPU mesh layer is the surface TPU mesh layer. The second TPU mesh layer is disposed on the first TPU mesh layer, and the third TPU mesh layer is disposed on the second TPU mesh layer.

Therefore, a range of the fiber fineness of the surface TPU mesh layer is different from a range of fiber fineness of another TPU mesh layer, and the fiber fineness of the surface TPU mesh layer ranges from 5 µm to 10 µm, so that the peeling strength of the TPU mesh layers of the artificial leather 10 can be increased to be greater than 2.5 Kg/cm, and preferred peeling strength may be 3 Kg/cm, to satisfy a standard of high peeling strength of the shoes upper material.

Figure 2:
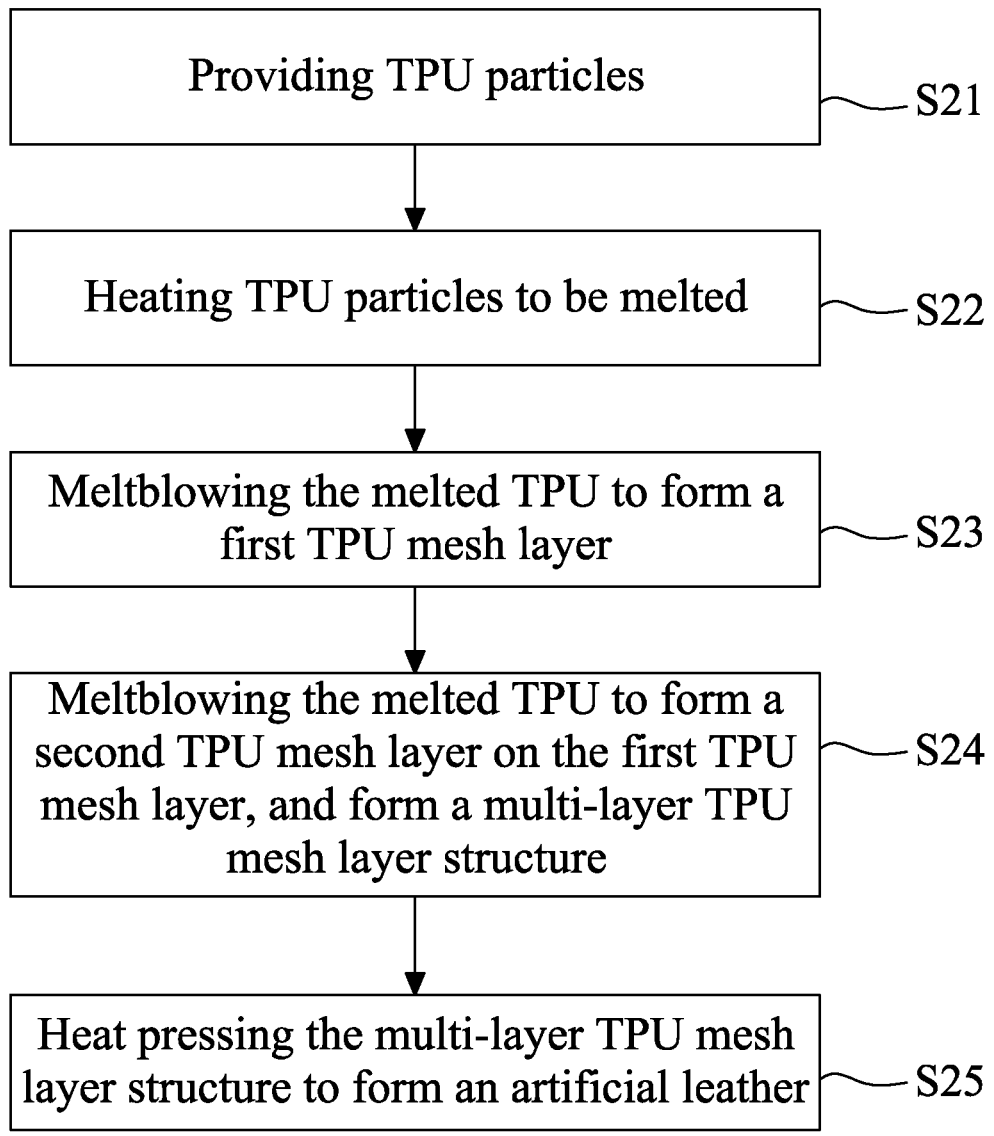
FIG. 2 is a schematic flowchart of a manufacturing method of an artificial leather according to an embodiment of the present invention.
Figure 3:
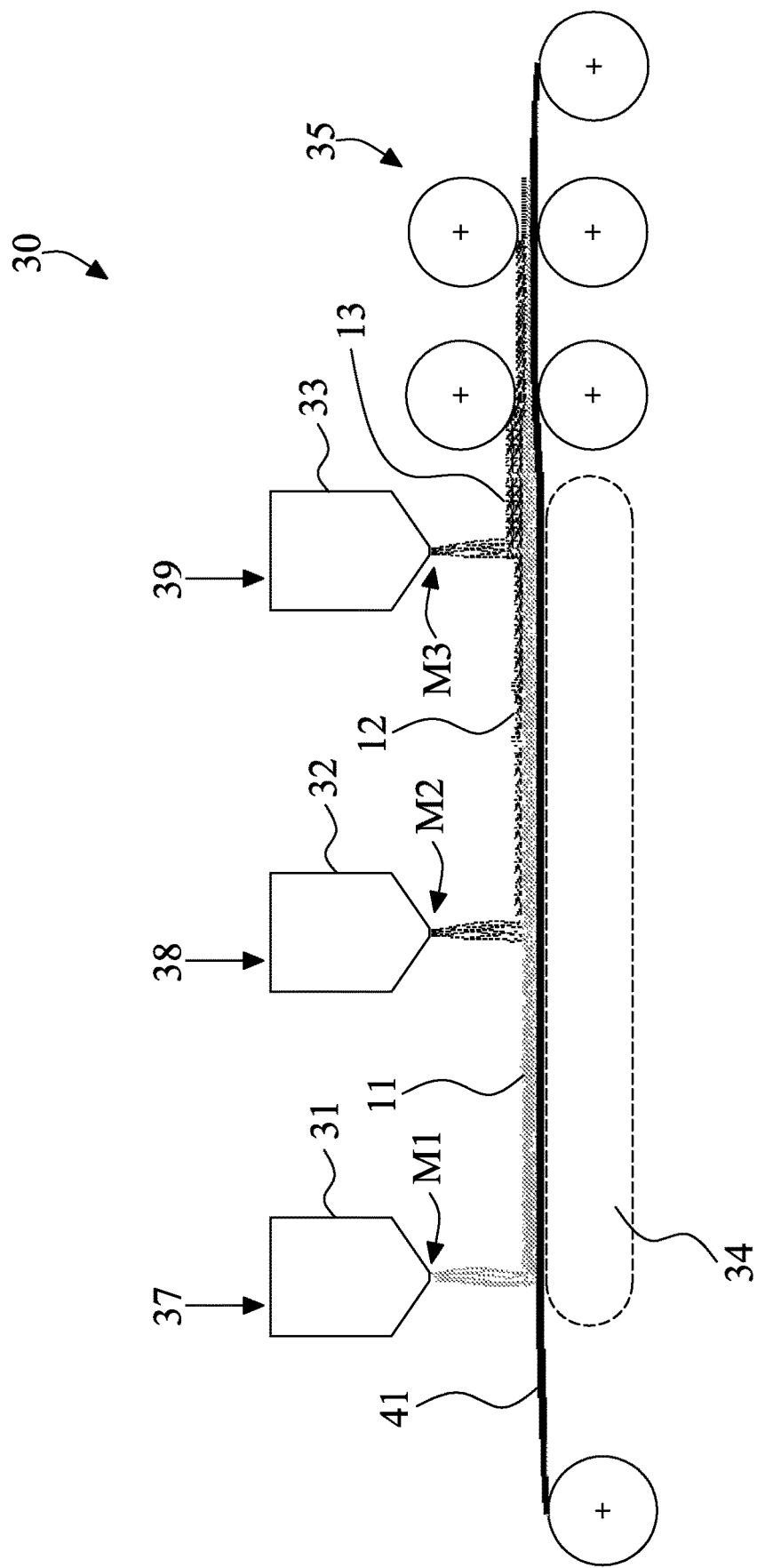
FIG. 3 is a schematic of a manufacturing device of an artificial leather according to an embodiment of the present disclosure.

FIG. 2 is a schematic flowchart of a manufacturing method of an artificial leather according to an embodiment of the present invention. FIG. 3 is a schematic of a manufacturing device of an artificial leather according to an embodiment of the present disclosure. A manufacturing method of manufacturing the artificial leather by using an artificial leather manufacturing device 30 is described with reference to FIG. 2 and FIG. 3. First, referring to step S21, TPU pellets 37, 38, and 39 are provided. In an embodiment, TPU pellets include TPU pellets whose melting point is 118° C. and whose Shore Durometer is 90 A, TPU pellets whose melting point is 70° C. and whose Shore Durometer is 90 A, and TPU pellets whose melting point is 192° C. and whose Shore Durometer is 90 A, but are not limited to the foregoing.

Referring to step S22, TPU pellets are heated to melt. In an embodiment, TPU pellets are melted to the melted TPU by using an extruder 31, and the melting temperature of the extruder 31 is 190 to 230° C.

Referring to step S23, meltblowing is performed on the melted TPU, to form a first TPU mesh layer 11. In an embodiment, the melted TPU is blown out by using a meltblowing die-body M1 and pressurized air. Preferably, the temperature of the meltblowing die-body M1 is 220 to 240° C., and the air pressure and the air temperature of the pressurized air are respectively 6 to 8 kgf/cm$^2$ and 220 to 250° C.

In an embodiment, the first TPU mesh layer 11 may be meltblown onto a piece of release paper 41, the release paper 41 has a texture, and the fiber fineness of the first TPU mesh layer 11 ranges from 5 µm to 10 µm.

In an embodiment, the melted TPU may be meltblown onto a hole conveyor belt 34, TPU fibers are piled up to form a mesh, and air pressure are released by using the hole conveyor belt 34, to form the first TPU mesh layer. The fiber fineness of the first WU mesh layer ranges from 10 µm to 30 µm.

Referring to step S24, meltblowing is performed on the melted TPU, to form a second TPU mesh layer 12 on the first TPU mesh layer 11, and form a multi-layer TPU mesh layer structure. In an embodiment, the melted TPU is blown out by using a meltblowing die-body M2 and pressurized air. Preferably, the temperature of the meltblowing die-body M2 is 220 to 240° C., and the air pressure and the air temperature of the pressurized air are respectively 6 to 8 kg/cm$^2$ and 220 to 250° C.

In an embodiment, the fiber fineness of the second TPU mesh layer 12 ranges from 5 µm to 10 µm. The second TPU mesh layer 12 is the surface TPU mesh layer.

In an embodiment, the fiber fineness of the second TPU mesh layer 12 ranges from 10 µm to 30 µm, and the second WU mesh layer is not the surface TPU mesh layer. The manufacturing method of the artificial leather further includes a step of performing meltblowing on the melted TPU, to form a third TPU mesh layer 13 on the second TPU mesh layer 12. Fiber fineness of the third TPU mesh layer 13 ranges from 5 µm to 10 µm. The third TPU mesh layer is the surface TPU mesh layer. The multi-layer WU mesh layer structure includes: the first TPU mesh layer 11, the second. TPU mesh layer 12, and the third TPU mesh layer 13.

Referring to step S25, the multi-layer TPU mesh layer structure is heat pressed, to manufacture an artificial leather. In an embodiment, the multi-layer TPU mesh layer structure is heat pressed by using a heat pressing wheel 35, and the heat pressing wheel 35 may have a surface texture, so that the surface TPU mesh layer (the second TPU mesh layer or the third TPU mesh layer) has the surface texture.

In an embodiment, the manufacturing method of the artificial leather further includes a grinding step of performing surface grinding on the surface TPU mesh layer (the second TPU mesh layer or the third TPU mesh layer) by using a grinding machine, so that the surface TPU mesh layer (the second TPU mesh layer or the third TPU mesh layer) is formed a teasing structure.

In an embodiment, the manufacturing method of the artificial leather further includes a step of disposing a TPU thin film on the second TPU mesh layer. The step of heat pressing the multi-layer TPU mesh layer structure includes heat pressing the multi-layer TPU mesh layer structure by using a heat pressing wheel, and the heat pressing wheel has a surface texture, so that the TPU thin film has the surface texture.

According to the manufacturing method of the artificial leather in the present disclosure, the artificial leather can be manufactured by using only a simple meltblowing manufacturing procedure, greatly simplifying a working process of manufacturing the artificial leather, and no solvent is used in a meltblowing manufacturing procedure, satisfying a requirement for environmental protection. In addition, TPU is used for both the first TPU mesh layer and the second TPU mesh layer, and the TPU is an environmentally-friendly material not including a solvent, and is recyclable. In addition, in the present disclosure, TPU mesh layers of a same material is stacked by using the meltblowing manufacturing procedure, and peeling strength of the artificial leather can be greatly increased.

The present disclosure is illustrated in detail with the following embodiments, but it does not mean that the present disclosure is only limited to the content disclosed by these embodiments.

Embodiment 1

Referring to FIG. 2 and FIG. 3, TPU pellets 37 whose melting point is 118° C. and whose Shore Durometer is 90 A are put into an extruder 31 for melting, and the temperature is set to 190° C., 210° C., 220° C., and 230° C. successively from a feed area to a discharge area. After the melting, the melted TPU is delivered into a meltblowing die-body M1, and the temperature of the meltblowing die-body M1 is set to 230° C. In addition, pressurized air is connected to the meltblowing die-body M1, and air pressure of the pressurized air is 7 kgf/cm$^2$. In addition, the air is heated, the temperature of the heating is set to 240° C., and the air is delivered into the meltblowing die-body M1. When the air is blown out, the melted TPU is blown out at the same time, to form a TPU fiber, and then the TPU fiber is melted and blown onto a piece of release paper 41 having a texture. The fiber is piled up to form a mesh, and the texture of the release paper is directly transferred, to form a first TPU mesh layer 11. Fiber fineness of the first TPU mesh layer 11 ranges from 5 µm to 10 µm. The first TPU mesh layer 11 is the surface TPU mesh layer, and has the texture.

TPU pellets 38 whose melting point is 70° C. and whose Shore Durometer is 90 A are put into an extruder 32 for melting, and the temperature is set to 1.90° C., 210° C., 210° C., and 220° C. successively from a feed area to a discharge area. After the melting, the melted TPU is delivered into a meltblowing die-body M2, and the temperature of the meltblowing die-body M2 is set to 230° C. In addition, pressurized air is connected to the meltblowing die-body M2, and air pressure of the pressurized air is 7 kgf/cm². In addition, the air is heated, the temperature of the heating is set to 240° C., and the air is delivered into the meltblowing die-body M2. When the air is blown out, the melted TPU is blown out at the same time, to from a second TPU mesh layer 12 onto the first TPU mesh layer 11, and fiber fineness of the second TPU mesh layer 12 ranges from 10 µm to 30 µm, TPU pellets 39 whose melting point is 192° C. and whose Shore Durometer is 90 A are put into an extruder 33 for melting, and the temperature is set to 195° C., 220° C., 230° C., and 240° C. successively from a feed area to a discharge area. After the melting, the melted TPU is delivered into a meltblowing die-body M3, and the temperature of the meltblowing die-body M3 is set to 230° C. In addition, pressurized air is connected to the meltblowing die-body M3, and air pressure of the pressurized air is 7 kgf/cm². In addition, the air is heated, the temperature of the heating is set to 240° C., and the air is delivered into the meltblowing die-body M3, When the air is blown out, the melted TPU is blown out at the same time, to from a third TPU mesh layer 13 onto the second TPU mesh layer 12, and fiber fineness of the third TPU mesh layer 13 ranges from 10 µm to 30 µm. The first TPU mesh layer 11, the second TPU mesh layer 12, and the third TPU mesh layer 13 are formed as the multi-layer TPU mesh layer structure.

Next, the multi-layer TPU mesh layer structure is heat pressed by using a heat pressing wheel 35 whose temperature is 145° C., to control the thickness and the flatness. In addition, the second TPU mesh layer 12 is made of TPU whose melting point is 70° C. Therefore, after the second TPU mesh layer 12 is melted by the heat pressing wheel 35, peeling strength between the first TPU mesh layer 11 and the third TPU mesh layer 13 can be increased to be greater than 2.5 Kg/cm.

Embodiment 2

Referring to FIG. 2 and FIG. 3, TPU pellets 37 whose melting point is 192° C. and whose Shore Durometer is 90A are put into an extruder 31 for melting, and the temperature is set to 195° C., 220° C., 230° C., and 240° C. successively from a feed area to a discharge area. After the melting, the melted TPU is delivered into a meltblowing die-body M1, and the temperature of the meltblowing die-body M1 is set to 240° C. In addition, pressurized air is connected to the meltblowing die-body M1, and air pressure of the pressurized air is 7 kgf/cm². In addition, the air is heated, the temperature of the heating is set to 240° C., and the air is delivered into the meltblowing die-body M1. When the air is blown out, the melted TPU is blown out at the same time, to form a TPU fiber. Then, the TPU fiber is piled up to form a mesh using a hole conveyor belt 34, and the high speed pressure are released by the hole conveyor belt 34 to form a first TPU mesh layer 11. Fiber fineness of the first TPU mesh layer 11 ranges from 10 µm to 30 µm.

TPU pellets 38 whose melting point is 70° C. and whose Shore Durometer is 90 A are put into an extruder 32 for melting, and the temperature is set to 189° C., 211° C., 210° C., and 223° C. successively from a feed area to a discharge area. After the melting, the melted TPU is delivered into a meltblowing die-body M2, and the temperature of the meltblowing die-body M2 is set to 240° C. In addition, pressurized air is connected to the meltblowing die-body M2, and air pressure of the pressurized air is 7 kgf/cm². In addition, the air is heated, the temperature of the heating is set to 240° C., and the air is delivered into the meltblowing die-body M2. When the air is blown out, the melted TPU is blown out at the same time, to from a second TPU mesh layer 12 onto the first TPU mesh layer 11, and fiber fineness of the second TPU mesh layer 12 ranges from 10 µm to 30 µm.

TPU pellets 39 whose melting point is 192° C. and whose Shore Durometer is 90 A are put into an extruder 33 for melting, and the temperature is set to 1.95° C., 223° C., 232° C., and 240° C. successively from a feed area to a discharge area. After the melting, the melted TPU is delivered into a meltblowing die-body M3, and the temperature of the meltblowing die-body M3 is set to 240° C. In addition, pressurized air is connected to the meltblowing die-body M3, and air pressure of the pressurized air is 7 kgf/cm². In addition, the air is heated, the temperature of the heating is set to 240° C., and the air is delivered into the meltblowing die-body M3. When the air is blown out, the melted TPU is blown out at the same time, to from a third TPU mesh layer 13 onto the second TPU mesh layer 12, and fiber fineness of the third TPU mesh layer 13 ranges from 5 to 10 µm. The first TPU mesh layer 11, the second TPU mesh layer 12, and the third TPU mesh layer 13 are formed as the multi-layer TPU mesh layer structure.

Next, the multi-layer TPU mesh layer structure is heat pressed by using a heat pressing wheel 35 whose temperature is 145° C., to control the thickness and the flatness. In addition, the second TPU mesh layer 12 is made of TPU whose melting point is 70° C. Therefore, after the second TPU mesh layer 12 is melted by the heat pressing wheel 35, peeling strength between the first TPU mesh layer 11 and the third TPU mesh layer 13 can be increased to be greater than 2.5 Kg/cm.

Finally, after surface grinding is performed on the third TPU mesh layer 13 by using an 80-mesh/160-mesh/400-mesh grinding machine, a teasing artificial leather can be manufactured.

Embodiment 3

Referring to FIG. 2 and FIG. 3, TPU pellets 37 whose melting point is 118° C. and whose Shore Durometer is 90 A are put into an extruder 31 for melting, and the temperature is set to 189° C., 211° C., 223° C., and 232° C. successively from a feed area to a discharge area. After the melting, the melted TPU is delivered into a meltblowing die-body M1, and the temperature of the meltblowing die-body M1 is set to 230° C. In addition, pressurized air is connected to the meltblowing die-body M1, and air pressure of the pressurized air is 7 kgf/cm². In addition, the air is heated, the temperature of the heating is set to 239° C., and the air is delivered into the meltblowing die-body M1, When the air is blown out, the melted TPU is blown out at the same time, to form a TPU fiber. Then, the TPU fiber is piled up to form a mesh using a hole conveyor belt 34, and the high speed wind pressure are released by the hole conveyor belt 34 to form a first TPU mesh layer 11. Fiber fineness of the first TPU mesh layer 11 ranges from 10 µm to 30 µm.

TPU pellets 38 whose melting point is 70° C. and whose Shore Durometer is 90 A are put into an extruder 32 for melting, and the temperature is set to 189° C., 200° C., 212° C., and 220° C. successively from a feed area to a discharge area. After the melting, the melted TPU is delivered into a meltblowing die-body M2, and the temperature of the meltblowing die-body M2 is set to 230° C. In addition, pressurized air is connected to the meltblowing die-body M2, and air pressure of the pressurized air is 7 kgf/cm². In addition, the air is heated, the temperature of the heating is set to 239° C., and the air is delivered into the meltblowing die-body M2. When the air is blown out, the melted TPU is blown out at the same time, to from a second TPU mesh layer 12 onto the first TPU mesh layer 11, and fiber fineness of the second TPU mesh layer 12 ranges from 10 μm to 30 μm.

TPU pellets 39 whose melting point is 192° C. and whose Shore Durometer is 90 A are put into an extruder 33 for melting, and the temperature is set to 195° C., 220° C., 230° C., and 240° C. successively from a feed area to a discharge area. After the melting, the melted TPU is delivered into a meltblowing die-body M3, and the temperature of the meltblowing die-body M3 is set to 230° C. In addition, pressurized air is connected to the meltblowing die-body M3, and air pressure of the pressurized air is 7 kgf/cm². In addition, the air is heated, the temperature of the heating is set to 239° C., and the air is delivered into the meltblowing die-body M3. When the air is blown out, the melted TPU is blown out at the same time, to from a third TPU mesh layer 13 onto the second TPU mesh layer 12, and fiber fineness of the third TPU mesh layer 13 ranges from 5 μm to 10 μm. The first TPU mesh layer 11, the second TPU mesh layer 12, and the third TPU mesh layer 13 are formed as the multi-layer TPU mesh layer structure.

Next, the multi-layer TPU mesh layer structure is heat pressed by using a heat pressing wheel 35 whose temperature is 145° C., to control the thickness and the flatness. In addition, the second TPU mesh layer 12 is made of TPU whose melting point is 70° C. Therefore, after the second TPU mesh layer 12 is melted by the heat pressing wheel 35, peeling strength between the first TPU mesh layer 11 and the third TPU mesh layer 13 can be increased to be greater than 2.5 Kg/cm.

Embodiment 4

Referring to FIG. 2 and FIG. 3, TPU pellets 37 whose melting point is 192° C. and whose Shore Durometer is 90 A are put into an extruder 31 for melting, and the temperature is set to 195° C., 220° C., 230° C., and is 240° C. successively from a feed area to a discharge area. After the melting, the melted TPU is delivered into a meltblowing die-body M1, and the temperature of the meltblowing die-body M1 is set to 240° C. In addition, pressurized air is connected to the meltblowing die-body M1, and air pressure of the pressurized air is 7 kgf/cm². In addition, the air is heated, the temperature of the heating is set to 240° C., and the air is delivered into the meltblowing die-body M1. When the air is blown out, the melted TPU is blown out at the same time, to form a TPU fiber. Then, the TPU fiber is piled up to form a mesh using a hole conveyor belt 34, and the high speed wind pressure are released by the hole conveyor belt 34 to form a first TPU mesh layer 11. Fiber fineness of the first TPU mesh layer 11 ranges from 10 μm to 30 μm.

TPU pellets 38 whose melting point is 70° C. and whose Shore Durometer is 90 A are put into an extruder 32 for melting, and the temperature is set to 189° C., 200° C., 212° C., and 220° C. successively from a feed area to a discharge area. After the melting, the melted. TPU is delivered into a meltblowing die-body M2, and the temperature of the meltblowing die-body M2 is set to 240° C. In addition, pressurized air is connected to the meltblowing die-body M2, and air pressure of the pressurized air is 7 kgf/cm². In addition, the air is heated, the temperature of the heating is set to 240° C. and the air is delivered into the meltblowing die-body M2. When the air is blown out, the melted TPU is blown out at the same time, to from a second TPU mesh layer 12 onto the first TPU mesh layer 11, and fiber fineness of the second TPU mesh layer 12 ranges from 5 μm to 10 μm.

Then, a TPU thin film is disposed on the second TPU mesh layer. The thickness of the TPU thin film is 0.05 mm. The material of the TPU thin film is the same as that of the second TPU mesh layer. The first TPU mesh layer 11, the second TPU mesh layer 12, and the TPU thin film are formed as the multi-layer TPU mesh layer structure.

Next, the multi-layer TPU mesh layer structure is heat pressed by using a heat pressing wheel 35 whose temperature is 145° C., to control the thickness and the flatness. The heat pressing wheel 35 has a surface texture, so that the TPU thin film has the surface texture. In addition, the second TPU mesh layer 12 is made of TPU whose melting point is 70° C. Therefore, after the second TPU mesh layer 12 is melted by the heat pressing wheel 35, peeling strength between the first TPU mesh layer 11 and the TPU thin film can be increased to be greater than 2.5 Kg/cm.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized in accordance with some embodiments of the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. An artificial leather, comprising:
multi-layer thermoplastic polyurethane (TPU) mesh layers, wherein fiber fineness of the TPU mesh layers ranges from 5 μm to 30 μm, and peeling strength of the TPU mesh layers is greater than 2.5 Kg/cm; and
wherein the TPU mesh layers are made of TPU particles, said TPU particles include TPU particles whose melting point is 110-130° C. and whose Shore scleroscope hardness is 80-95A, TPU particles whose melting point is 65-80° C. and whose Shore scleroscope hardness is 80-95A, and TPU particles whose melting point is 180-200° C. and whose Shore scleroscope hardness is 80-95A.

2. The artificial leather of claim 1, wherein the TPU mesh layers comprise a first TPU mesh layer, and fiber fineness of the first TPU mesh layer ranges from 10 μm to 30 μm.

3. The artificial leather of claim 2, wherein the TPU mesh layers further comprise a second TPU mesh layer disposed on the first TPU mesh layer, and fiber fineness of the second TPU mesh layer ranges from 5 μm to 10 μm, the second TPU mesh layer is a surface TPU mesh layer.

4. The artificial leather of claim 2, wherein the TPU mesh layers further comprise a second TPU mesh layer disposed on the first TPU mesh layer, and fiber fineness of the second TPU mesh layer ranges from 10 μm to 30 μm.

5. The artificial leather of claim 4, wherein the TPU mesh layers further comprise a third TPU mesh layer disposed on the second TPU mesh layer, and fiber fineness of the third TPU mesh layer ranges from 5 μm to 10 μm; the third TPU mesh layer is a surface TPU mesh layer.

6. The artificial leather of claim 1, further comprising at least one combination joint formed between the two adjacent TPU mesh layers.

\* \* \* \* \*